United States Patent
Sugio

(10) Patent No.: US 9,764,471 B2
(45) Date of Patent: Sep. 19, 2017

(54) TRAJECTORY GENERATION APPARATUS FOR ROBOT TO GENERATE TRAJECTORY INCLUDING CURVED PORTION

(71) Applicant: FANUC CORPORATION, Yamanashi (JP)

(72) Inventor: Kenji Sugio, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 14 days.

(21) Appl. No.: 15/060,500

(22) Filed: Mar. 3, 2016

(65) Prior Publication Data

US 2016/0271799 A1 Sep. 22, 2016

(30) Foreign Application Priority Data

Mar. 16, 2015 (JP) ................................ 2015-052524

(51) Int. Cl.
G05B 15/00 (2006.01)
B25J 9/16 (2006.01)

(52) U.S. Cl.
CPC ... B25J 9/1664 (2013.01); *G05B 2219/40386* (2013.01)

(58) Field of Classification Search
CPC ......... B25J 9/1664; G05B 2219/40386; G05B 2219/40519
See application file for complete search history.

(56) References Cited

U.S. PATENT DOCUMENTS

| 8,140,189 B2* | 3/2012 | Nagasaka | B25J 9/1671 318/568.11 |
|---|---|---|---|
| 2005/0228539 A1* | 10/2005 | Takenaka | B62D 57/032 700/245 |
| 2009/0037021 A1 | 2/2009 | Sladek et al. | |
| 2013/0345875 A1* | 12/2013 | Brooks | B25J 9/0087 700/259 |
| 2014/0012419 A1* | 1/2014 | Nakajima | B25J 9/1633 700/261 |

(Continued)

FOREIGN PATENT DOCUMENTS

| JP | 63-180108 A | 7/1988 |
|---|---|---|
| JP | 08-141953 A | 6/1996 |

(Continued)

*Primary Examiner* — Khoi Tran
*Assistant Examiner* — Jorge Peche
(74) *Attorney, Agent, or Firm* — Hauptman Ham, LLP

(57) ABSTRACT

A trajectory generation apparatus for robot includes a load judgement unit which compares a load applied to a component of a robot when the robot is operated on a reference trajectory with a load judgement value and a speed reduction unit which reduces a speed of the robot when the load is greater than the load judgement value. The trajectory generation apparatus includes a comparison trajectory generation unit which sets a comparison teaching point obtained by changing a position of a reference teaching point when the speed is reduced and generates a comparison trajectory based on the comparison teaching point and a trajectory selection unit which compares a transit time of the comparison trajectory with a transit time of the reference trajectory and selects a trajectory of which a transit time is shorter.

6 Claims, 8 Drawing Sheets

(56) References Cited

U.S. PATENT DOCUMENTS

| | | | | |
|---|---|---|---|---|
| 2014/0052294 A1* | 2/2014 | Herre | ................. | B05B 13/0431 |
| | | | | 700/248 |
| 2015/0025684 A1* | 1/2015 | Negishi | ................. | B25J 9/1664 |
| | | | | 700/261 |
| 2015/0148952 A1* | 5/2015 | Shiratsuchi | ............ | B25J 9/1682 |
| | | | | 700/248 |
| 2016/0236349 A1* | 8/2016 | Yamane | ................. | B25J 9/1664 |

FOREIGN PATENT DOCUMENTS

| | | |
|---|---|---|
| JP | 08-339222 A | 12/1996 |
| JP | 10-69310 A | 3/1998 |
| JP | 10-329068 A | 12/1998 |
| JP | 2014-14876 A | 1/2014 |

\* cited by examiner

TRAJECTORY GENERATION APPARATUS FOR ROBOT TO GENERATE TRAJECTORY INCLUDING CURVED PORTION

RELATED APPLICATIONS

The present application claims priority to Japanese Patent Application Number 2015-052524, filed Mar. 16, 2015, the disclosure of which is hereby incorporated by reference herein in its entirety.

BACKGROUND OF THE INVENTION

1. Field of the Invention

The present invention relates to a trajectory generation apparatus for generating a trajectory of a robot.

2. Description of the Related Art

A robot is controlled to move along a trajectory generated in advance. The trajectory of robot can be generated by a trajectory generation apparatus. The trajectory generation apparatus generates a trajectory based on teaching points and a speed specified by an operator. For example, the operator inputs teaching points generated in advance to the trajectory generation apparatus. The trajectory generation apparatus generates trajectory passing through or near the teaching points.

In this regard, when a robot is driven at the specified speed along trajectory generated by trajectory generation apparatus, a load applied to the robot becomes larger in some cases. According to the conventional techniques, when the load applied to the robot is large, the speed of the robot is reduced.

Japanese Laid-open Patent Publication No. 10-69310 discloses an apparatus for generating a trajectory for a robot which obtains a realizable moving speed when a tip portion of a robot passes the inside of a teaching point and calculates a deceleration rate with respect to the moving speed recorded in teaching point data. It is disclosed that at an operation of the robot, the robot is operated by being decelerated according to deceleration rate of an inward turning portion.

Japanese Laid-open Patent Publication No. 2014-14876 discloses a robot control apparatus which divides a movable range of a robot arm into multiple spaces and sets a constraint value of jerk so that load torque falls within an allowable range in each of the multiple spaces. It is disclosed that a calculating unit generates an instruction value to an electric motor so that the robot arm follows a specified trajectory.

When a robot is accelerated, decelerated, changes a direction, or the like, a load is applied thereto. For example, a large force is applied to a transmission of a driving apparatus for driving joint units of the robot. In particular, a larger load is applied to the robot when being driven on a curved portion of a trajectory than when being driven on a straight line portion of the trajectory. There is a problem that, when an operation of the robot is continued under an excessive load, the life of the robot is shortened.

As described in Japanese Laid-open Patent Publication No. 10-69310, when a load is large, the robot can be decelerated to reduce the load. In particular, a curved portion of a trajectory, the robot can be decelerated to reduce the load. However, there is a problem that reduction of a speed of the robot prolongs a cycle time of the robot. In other words, there is a problem that an operation time of the robot is prolonged.

On the other hand, an operator may want to increase the speed of the robot rather than to be precise in the trajectory. In other words, it is preferable in some cases to drive the robot without reducing the speed as much as possible even if the trajectory is slightly separated from desired teaching points. In particular, a deceleration rate becomes larger at the curved portion of the trajectory at which a larger load is applied to the robot, and thus it is preferable to make an operation of the robot faster at the curved portion of the trajectory.

SUMMARY OF INVENTION

A trajectory generation apparatus for robot according to the present invention comprises a reference trajectory generation unit which generates a reference trajectory including a curved portion based on a plurality of reference teaching points and a load judgement unit which calculates a load applied to a predetermined component of a robot when the robot is operated along the reference trajectory and compare the load with a predetermined load judgement value. The trajectory generation apparatus for robot includes a speed reduction unit which reduces a speed of the robot until the load becomes equal to or less than the load judgement value when the load is greater than the load judgement value, a comparison trajectory generation unit which sets a comparison teaching point obtained by changing a position of the reference teaching point when the speed is reduced by the speed reduction unit and generates a comparison trajectory based on the comparison teaching point, and a trajectory selection unit which compares a transit time of the comparison trajectory with a transit time of the reference trajectory and selects a trajectory of which a transit time is shorter.

According to the above-described invention, the comparison trajectory generation unit can set the comparison teaching point so that a curvature radius of the comparison trajectory is larger than a curvature radius of the reference trajectory at the curved portion.

According to the above-described invention, the comparison trajectory generation unit can generate the comparison trajectory based on a predetermined allowable condition of trajectory, and the allowable condition of trajectory can be a matter that a distance from the reference teaching point to the comparison trajectory is less than a predetermined judgement value.

According to the above-described invention, the comparison trajectory generation unit can generate the comparison trajectory based on a predetermined allowable condition of trajectory, and the allowable condition of trajectory can be a matter that a distance between the reference trajectory and the comparison trajectory is less than a predetermined judgement value.

According to the above-described invention, the load is torque applied to the component, and the load judgement unit can calculate the torque from acceleration of each shaft of the robot.

According to the above-described invention, the load is a change rate of torque applied to the component, and the load judgement unit can calculate the change rate of torque from jerk of each shaft of the robot.

DETAILED DESCRIPTION

A trajectory generation apparatus for robot according to an embodiment is described below with reference to FIG. 1 to FIG. 13. A robot system of the present embodiment drives a robot based on a trajectory generated by the trajectory generation apparatus. The robot is controlled so that a tool tip point passes through the generated trajectory.

Figure 1:
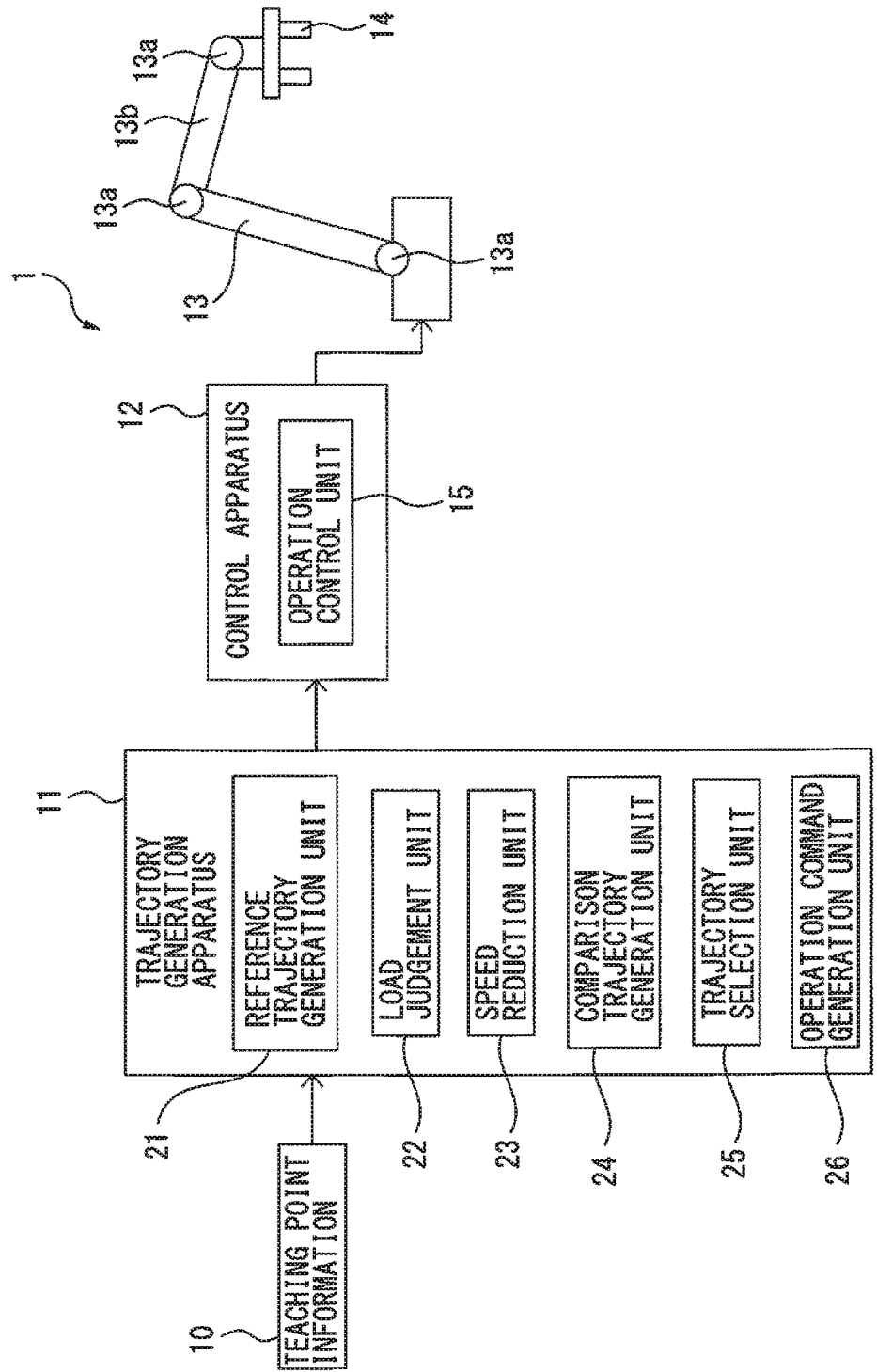
FIG. 1 is a block diagram illustrating a robot system according to an embodiment.

FIG. 1 is a schematic drawing of the robot system according to the present embodiment. A robot system 1 of the present embodiment comprises a robot 13 for conveying a workpiece and a control apparatus 12 for controlling the robot 13. The robot 13 of the present embodiment is an articulated robot including a plurality of joint units 13a. A hand 17 for gripping a workpiece is disposed on a tip end of an arm 13b of the robot 13. The robot 13 includes an arm driving apparatus for driving each of the joint units 13a. The arm driving apparatus includes an arm driving motor and a reducer which are disposed inside of the joint unit 13a. The arm driving motor is driven, and thus the arm 13b can be bent at a desired angle at the joint units 13a.

The robot system 1 includes a trajectory generation apparatus 11 for generating a trajectory of the robot 13. The trajectory generation apparatus 11 is constituted of an arithmetic processing apparatus including, for example, CPU (a central processing unit), RAM (a random access memory), ROM (a read only memory), and the like. Further, the trajectory generation apparatus 11 includes a storage unit for storing various pieces of information.

To the trajectory generation apparatus 11, predetermined teaching point information 10 is input. The teaching point information 10 includes position information of a teaching point. The teaching point information 10 includes, for example, three-dimensional coordinate values of a teaching point. The teaching point information 10 can be input to the trajectory generation apparatus 11 by, for example, an operator operating an operation panel for setting a teaching point. Alternatively, the trajectory generation apparatus 11 may obtain a position of a teaching point from a robot operation program as the teaching point information 10.

The trajectory generation apparatus 11 generates a trajectory of the robot 13 based on the teaching point information 10. The trajectory generation apparatus 11 generates an operation command of each shaft of the robot so that the tool tip point of the robot 13 passes through the generated trajectory. The operation command of the robot 13 is transmitted to an operation control unit 15 of the control apparatus 12. The operation control unit 15 drives the arm driving apparatus and the like based on the operation command.

The trajectory generation apparatus 11 of the present embodiment includes a reference trajectory generation unit 21 for generating a reference trajectory based on the teaching point information 10. According to the present invention, a teaching point input to the trajectory generation apparatus 11 is referred to as a reference teaching point. In addition, a trajectory generated by the reference trajectory generation unit 21 based on the reference teaching point is referred to as a reference trajectory.

Figure 2:
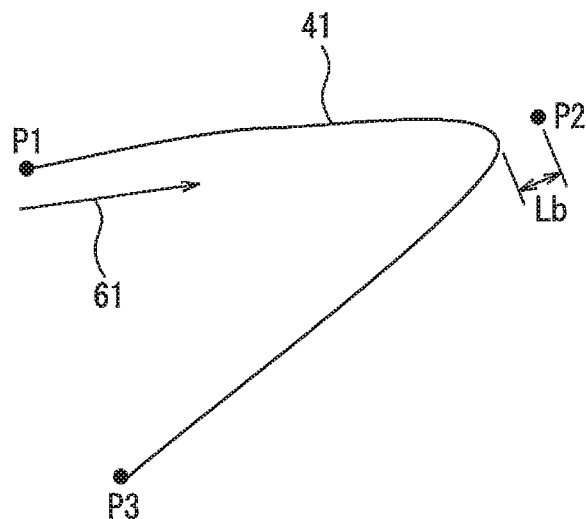
FIG. 2 is a schematic drawing illustrating a first reference trajectory according to the embodiment.

FIG. 2 shows a schematic drawing illustrating a first reference trajectory according to the present embodiment. The reference trajectory generation unit 21 generates a reference trajectory 41 based on a plurality of reference teaching points P1, P2, and P3. The trajectory includes a straight-line portion extending straight and a curved portion extending by curving. The curved portion is described in the present embodiment. In the reference trajectory 41 exemplified in FIG. 2, the tool tip point is moved in a direction indicated by an arrow 61.

A first reference trajectory 41 of the present embodiment is allowed to be deviated from the reference teaching points P1 to P3. An upper limit value of a distance Lb from the reference teaching point P2 to the reference trajectory 41 is determined in advance as a judgement value. A shortest distance between the reference teaching point P2 and the reference trajectory 41 is regarded as the distance Lb from the reference teaching point P2 to the reference trajectory 41. The reference trajectory generation unit 21 generates the reference trajectory 41 so that the distance Lb is less than the judgement value.

The reference trajectory can be generated by solving the following equations based on, for example, the three successive reference teaching points P1, P2, and P3 and a speed specified in advance. The reference trajectory 41 can be obtained as a function of time.

$$V(t)=\dot{P}(t),\ A(t)=\dot{V}(t)\ (0 \le t \le T)$$

$$V(0)=Vs,\ V(T)=Ve,\ V(T/2)=Vm\ (|Vs|=|Ve|=|Vm|)$$

$$A(0)=0,\ A(T)=0$$

$$L=P(T/2)-P2$$

t: time
P(t): position on trajectory
V(t): speed
A(t): acceleration
Vs: speed at start time of curved portion
Ve: speed at end time of curved portion
Vm: speed at middle point (time) of curved portion
L: distance between position of middle point (time) of curved portion and reference teaching point In this regard, a start point of a curved portion can be selected from points on a line connecting the reference teaching point P1 and the reference teaching point P2. An end point of the curved portion can be selected from points on a line connecting the reference teaching point P2 and the reference teaching point P3. A middle point of the curved portion is a point on the trajectory at a middle time between a time at the start point and a time at the end point. A posture of the robot 13 is determined by a rotation angle of each shaft and can be set by an arbitrary method. For example, the posture of the robot 13 can be set to continuously change from a posture at the start point of the curved portion to a posture at the end point of the curved portion.

As a method for generating a trajectory based on specified teaching points, an arbitrary method can be adopted without being limited to the embodiment. For example, a deceleration portion of an operation from the reference teaching point P1 to the reference teaching point P2 and an acceleration portion of the operation from the reference teaching point P2 to the reference teaching point P3 are overlapped with each other, and a curved trajectory can be formed. When an overlapped period is changed, a distance from the reference teaching point to the reference trajectory can be adjusted to be less than the judgement value.

The trajectory generation apparatus 11 includes a load judgement unit 22 for calculating a load applied to a component of the robot when the robot is operated on a predetermined trajectory. The load judgement unit 22 further compares the calculated load with a predetermined load judgement value.

Torque can be exemplified as a load. The component of the robot can be determined in advance. For example, the reducer disposed on the joint unit 13a of the robot 13 can be exemplified as the component. A bearing and the like of the joint unit 13a can be also exemplified. The reducer disposed on the joint units 13a is described below.

Torque applied to the reducer corresponds to torque around each shaft of the robot. Thus, according to the present embodiment, torque around each shaft is adopted as a load applied to the reducer. As a load judgement value, a torque judgement value is set in advance. A torque value around each shaft corresponding to a maximum torque value which can be applied to the reducer is set to the torque judgement value.

The torque around each shaft can be calculated based on three-dimensional coordinate values of a predetermined point and coordinate values of points before and after the predetermined point on the trajectory. The three-dimensional coordinate values can be converted into the rotation angle of each shaft using inverse kinematics of the robot. The rotation angle of each shaft corresponds to a position of each shaft. A position and time of each shaft at a predetermined point and positions and times of each shaft at the points before and after the predetermined point can be calculated. A speed and acceleration of each shaft can be calculated based on differences of times and differences of angles of these points. The torque around each shaft can be calculated using an equation of robot kinematics based on the calculated positions, speeds, and acceleration of each shaft. The torque around each shaft is expressed by the following equation.

$$\tau = M(\theta)\ddot{\theta} + V(\theta,\dot{\theta}) + G(\theta)$$

τ: torque

M(θ): matrix regarding mass

V(θ, θ̇): vector indicating centrifugal force and Coriolis force term

G(θ): vector indicating gravity term

As described above, the torque of each shaft can be calculated at respective times when the robot is operated along the predetermined trajectory. The load judgement unit 22 compares the calculated torque with the predetermined torque judgement value. When the calculated torque is equal to or less than the torque judgement value, the reference trajectory is adopted as the trajectory of the robot.

The trajectory generation apparatus 11 includes a speed reduction unit 23. The speed reduction unit 23 reduces the speed when the calculated torque applied to the component is greater than the torque judgement value. The speed reduction unit 23 reduces the speed of the robot until the torque applied to the component becomes equal to or less than the torque judgement value.

According to the present embodiment, the speed is reduced until the calculated torque around each shaft becomes equal to or less than the torque judgement value with respect to all of the reducers disposed on the plurality of joint units 13a. A speed when the torque around all shafts becomes equal to or less than the torque judgement value is set as a reference speed regarding the reference trajectory.

As described above, according to the present embodiment, the speed is adjusted with respect to the reference trajectory so that the load applied to the component of the robot is less than the load judgement value.

The trajectory generation apparatus 11 includes a comparison trajectory generation unit 24 for generating a comparison trajectory based on the reference trajectory when the speed is reduced by the speed reduction unit 23. The comparison trajectory generation unit 24 sets a comparison teaching point obtained by changing a position of the reference teaching point. The comparison trajectory generation unit 24 generates the comparison trajectory based on the comparison teaching point. In this regard, the comparison trajectory generation unit 24 generates the comparison trajectory so that a curvature radius of the comparison trajectory is greater than a curvature radius of the reference trajectory at the curved portion. When a curvature of the trajectory is small, acceleration and jerk at the curved portion can be suppressed, and the load applied to the component of the robot can be reduced.

Figure 3:
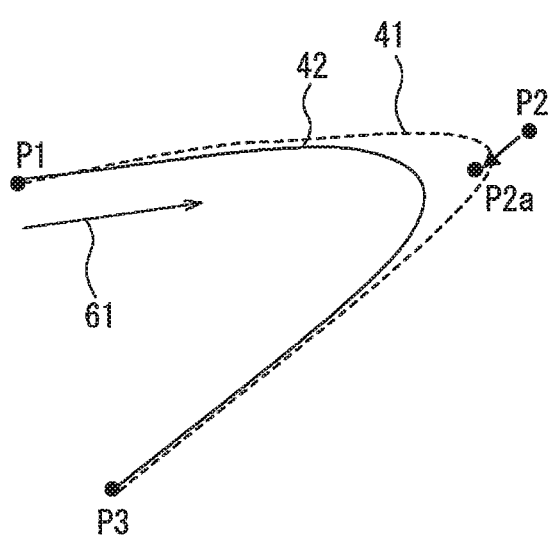
FIG. 3 is a schematic drawing illustrating a first comparison trajectory according to the embodiment.

FIG. 3 shows a schematic drawing illustrating the comparison trajectory. The curved portion of the reference trajectory 41 is generated based on the reference teaching points P1, P2, and P3. The reference teaching point P2 is a teaching point corresponding to a vertex of the curved portion of the reference trajectory 41. The comparison trajectory generation unit 24 sets a comparison teaching point P2a based on the reference teaching points P1, P2, and P3. The comparison trajectory generation unit 24 sets the comparison teaching point P2a on the inside of the curved reference trajectory 41. According to the present embodiment, the comparison trajectory generation unit 24 sets a movement direction and a movement length with respect to the reference teaching point P2. The comparison trajectory generation unit 24 sets the comparison teaching point P2a by moving the reference teaching point P2 based on the set movement direction and movement length.

Figure 4:
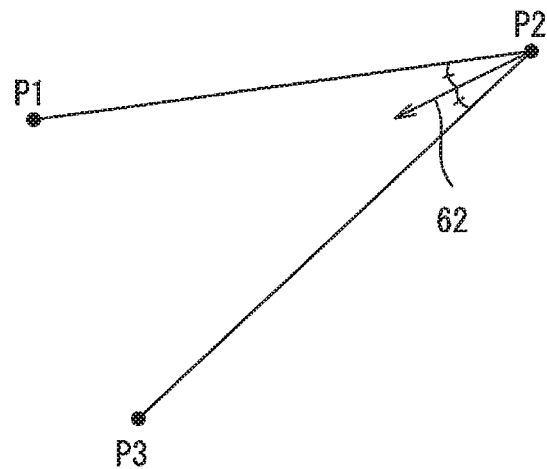
FIG. 4 is a schematic drawing illustrating a first movement direction when a comparison teaching point is set.

FIG. 4 shows a schematic drawing illustrating a first movement direction of the teaching points when the comparison teaching point is set. A straight line connecting the reference teaching point P1 and the reference teaching point P2 and a straight line connecting the reference teaching point P2 and the reference teaching point P3 are generated. A direction of a bisector of an angle at the reference teaching point P2 (a direction indicated by an arrow 62) can be set as the movement direction of the teaching point.

Figure 5:
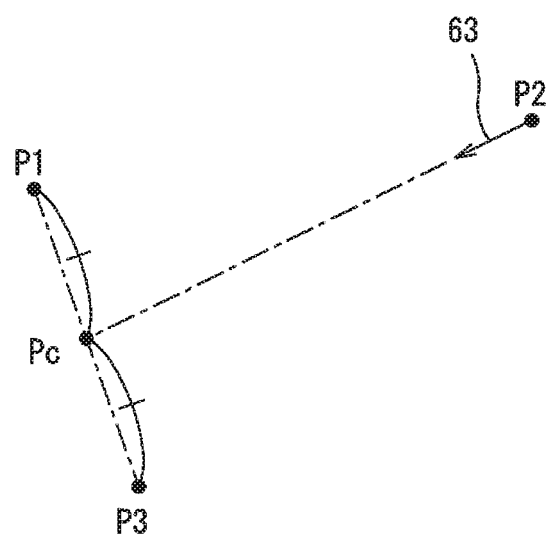
FIG. 5 is a schematic drawing illustrating a second movement direction when a comparison teaching point is set.

FIG. 5 shows a schematic drawing illustrating a second movement direction of the teaching points when the comparison teaching point is set. A middle point Pc between the reference teaching point P1 and the reference teaching point P3 is calculated. As indicated by an arrow 63, a direction from the reference teaching point P2 toward the middle point Pc can be set as the movement direction of the teaching point.

The movement direction of the teaching point is not limited to the first movement direction or the second movement direction described above, and the teaching point can be moved to an arbitrary direction in which the curvature radius of the trajectory becomes larger. For example, the reference teaching point P2 may be moved to a direction toward the reference teaching point P1. Alternatively, the reference teaching point P2 may be moved to a direction toward the reference teaching point P3.

Next, the movement length of the teaching point is described. The comparison trajectory generation unit 24 generates a comparison trajectory 42 based on a predetermined allowable condition of trajectory.

Figure 6:
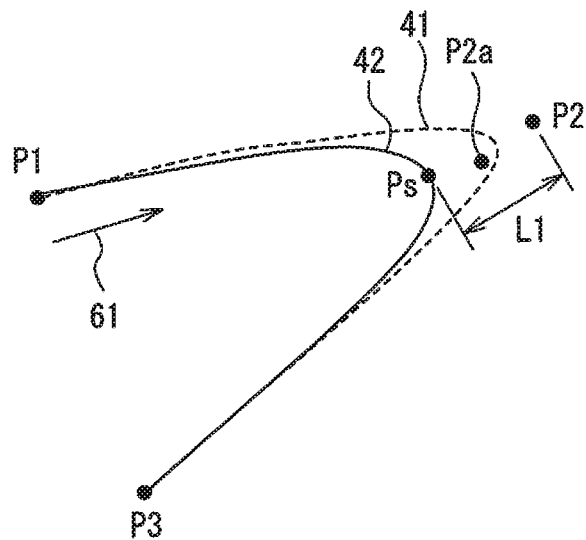
FIG. 6 is a schematic drawing illustrating an allowable condition of first trajectory when a comparison trajectory is generated.

FIG. 6 shows is a schematic drawing illustrating an allowable condition of first trajectory when the comparison trajectory is generated. As for the first allowable condition of trajectory, it is set that a distance from the reference teaching point P2 to the comparison trajectory 42 is less than a predetermined judgement value. In other words, an upper limit value of the distance is set in advance so that the comparison trajectory 42 is not greatly separated from the reference teaching point P2. Among distances from the reference teaching point P2 to points on the comparison trajectory 42, the shortest distance can be set as a distance L1 from the reference teaching point P2 to the comparison trajectory 42. In the example illustrated in FIG. 6, a distance from the reference teaching point P2 to a point Ps on the comparison trajectory 42 corresponds to the distance L1 from the reference teaching point P2 to the comparison trajectory 42.

The comparison trajectory generation unit 24 generates the comparison teaching point P2a by moving the reference teaching point P2 to the set movement direction. The reference teaching point P2 can be moved by the predetermined movement length. The comparison trajectory generation unit 24 generates the comparison trajectory 42 based on the reference teaching points P1 and P3 and the comparison teaching point P2a using a method same as the generation method of the reference trajectory 41.

Next, the comparison trajectory generation unit 24 judges whether the distance L1 from the reference teaching point P2 to the comparison trajectory 42 is less than a predetermined judgement value. When the distance L1 is less than the predetermined judgement value, the movement length of the reference teaching point P2 can be further longer. As described above, the movement length is gradually lengthened, and the comparison trajectory 42 is formed so that the distance L1 becomes a maximum allowable length. When the distance L1 is equal to or greater than the predetermined judgement value, the movement length of the reference teaching point P2 may be controlled to be shorter.

As the movement length of the reference teaching point P2 becomes longer, the curvature radius of the curved portion of the comparison trajectory 42 can be larger. According to the present embodiment, the comparison teaching point P2a is set so that the movement length of the reference teaching point P2 becomes the maximum in a range satisfying the allowable condition of trajectory. By adopting this control, the curvature radius of the curved portion of the comparison trajectory 42 can be made larger.

As described above, the comparison trajectory generation unit 24 can generate the comparison trajectory 42 based on the comparison teaching point P2a obtained by moving the reference teaching point P2. Next, a speed when the robot 13 is operated along the comparison trajectory 42 is calculated based on the generated comparison trajectory 42. The speed reduction unit 23 reduces the speed until the torque applied to the component becomes equal to or less than the torque judgement value by a method same as that used for the reference speed on the reference trajectory 41. The speed at that time can be set as a comparison speed on the comparison trajectory. Since the curvature radius of the comparison trajectory 42 is larger than that of the reference trajectory 41, the comparison speed may be faster than the reference speed.

The predetermined allowable condition of trajectory is not limited to the above-described distance between the reference teaching point and the comparison trajectory, and an arbitrary condition can be adopted for generating a comparison trajectory so as not to be greatly separated from the reference teaching point.

Figure 7:
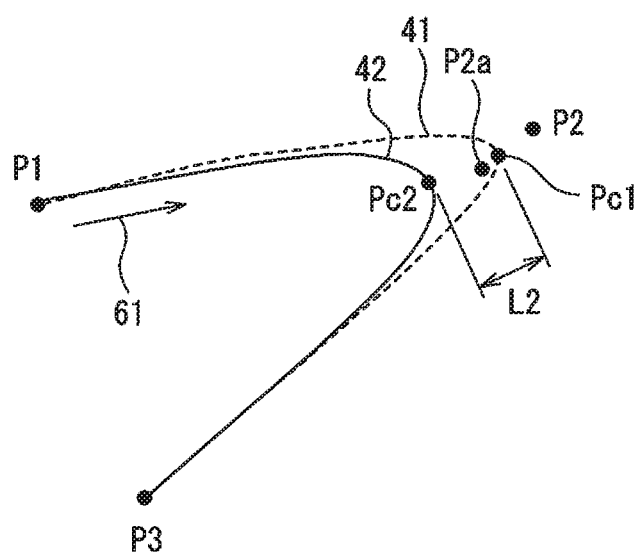
FIG. 7 is a schematic drawing illustrating an allowable condition of second trajectory when a comparison trajectory is generated.

FIG. 7 shows a schematic drawing illustrating an allowable condition of second trajectory when the comparison trajectory is generated. As for the second allowable condition of trajectory, a matter can be adopted that a distance L2 between the comparison trajectory 42 and the reference trajectory 41 is less than a predetermined judgement value. A middle point Pc1 at a middle time between a time at the start point and a time at the end point of the curved portion of the reference trajectory 41 is calculated. A middle point Pc2 at a middle time between a time at the start point and a time at the end point of the curved portion of the comparison trajectory 42 is calculated. A distance between the middle point Pc1 and the middle point Pc2 can be adopted as the distance L2 between the comparison trajectory 42 and the reference trajectory 41. Based on the allowable condition, the comparison trajectory 42 can be generated so as not to be greatly separated from the reference teaching point P2.

The trajectory generation apparatus 11 of the present embodiment includes a trajectory selection unit 25 for comparing a transit time of the reference trajectory and a transit time of the comparison trajectory and selecting a trajectory of which a transit time is shorter. The trajectory selection unit 25 calculates the transit time based on the reference trajectory 41 and the reference speed. For example, the transit time from the reference teaching point P1 until reaching the reference teaching point P3 passing near the reference teaching point P2 is calculated by targeting on one curved portion. The trajectory selection unit 25 calculates the transit time based on the comparison trajectory 42 and the comparison speed. For example, the transit time from the reference teaching point P1 until reaching the reference teaching point P3 passing near the comparison teaching point P2a is calculated. The trajectory selection unit 25 selects a trajectory of which a transit time is shorter as a trajectory for actually driving the robot. When the transit time of the reference trajectory 41 is the same as the transit time of the comparison trajectory 42, either trajectory may be adopted. In this case, the reference trajectory 41 is adopted according to the present embodiment.

The trajectory generation apparatus 11 includes an operation command generation unit 26 for generating an operation command of the control apparatus 12 based on the selected trajectory. The operation command generated by the operation command generation unit 26 is transmitted to the operation control unit 15 of the control apparatus 12.

Figure 8:
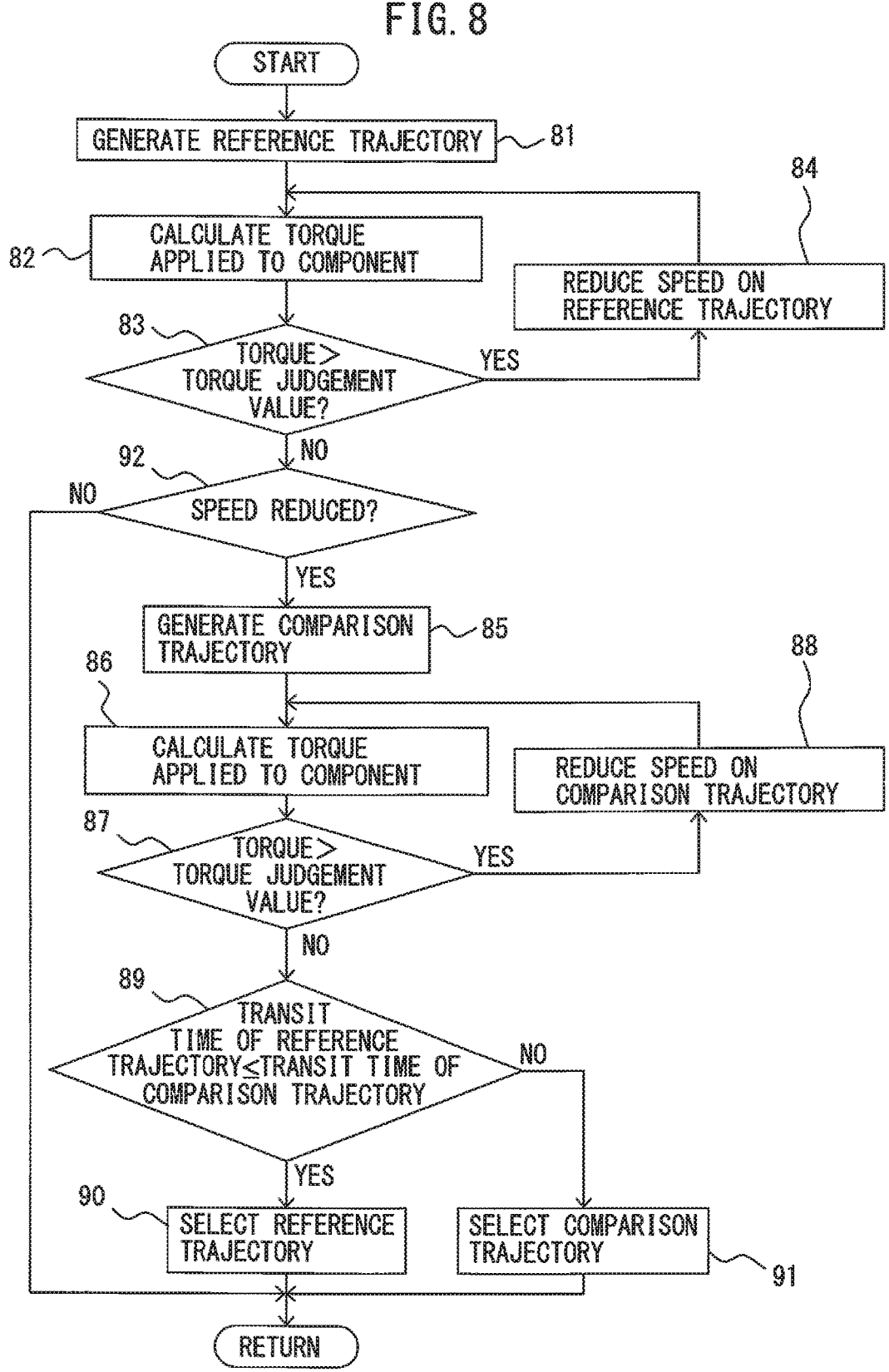
FIG. 8 is a flowchart of first control for generating a trajectory of a robot according to the embodiment.

FIG. 8 shows a flowchart illustrating first control of the trajectory generation apparatus according to the present embodiment. In step 81, the reference trajectory generation unit 21 generates the reference trajectory 41 based on the obtained the teaching point information 10.

Next, in step 82, the load judgement unit 22 calculates torque applied to the predetermined component based on the reference trajectory and a predetermined speed. An initial speed on the reference trajectory is specified in advance. In step 83, the load judgement unit 22 judges whether or not the calculated torque exceeds the torque judgement value. In the judgement, when a plurality of components is specified, judgement is performed on all of the components. According to the present embodiment, when the torque applied to at least one of the components exceeds the torque judgement value, the routine proceeds to step 84.

In step 84, the speed reduction unit 23 reduces the speed on the reference trajectory 41. According to the present embodiment, the speed is reduced at a predetermined reduction width. Then, the routine returns to step 82, and the torque applied to the component is calculated. As described above, the speed reduction unit 23 sets the reference speed by reducing the speed until the calculated torque becomes equal to or less than the torque judgement value.

In step 83, when the calculated torques are equal to or less than the torque judgement values with respect to all of the components, the routine proceeds to step 92. In step 92, it is judged whether or not the speed of the robot is reduced. In other words, it is judged whether or not excessive torque is applied to the component when the robot is driven at the initial speed. When the speed is not reduced, the control is terminated. In other words, the reference trajectory and the initial speed are adopted. When the speed is reduced, the routine proceeds to step 85.

In step 85, the comparison trajectory generation unit 24 generates the comparison trajectory 42. An initial speed on the comparison trajectory 42 can be specified in advance. The initial speed on the comparison trajectory is set to a speed the same as the initial speed on the reference trajectory.

Next, in step 86, the load judgement unit 22 calculates the torque applied to the component regarding the comparison trajectory. The control from step 86 to step 88 is the same as the control from step 82 to step 84. In step 87, the load judgement unit 22 judges whether or not the calculated torque regarding the comparison trajectory is greater than the torque judgement value. When the calculated torque is greater than the torque judgement value, the routine proceeds to step 88.

In step 88, the speed reduction unit 23 reduces the speed. The speed reduction unit 23 reduces the speed at a predetermined speed width. Then, the routine returns to step 86, the torque applied to the component is calculated. The speed reduction unit 23 sets the comparison speed by reducing the speed until the torque applied to the component becomes equal to or less than the torque judgement value. In step 87, when the calculated torque is less than the torque judgement value, the routine proceeds to step 89.

Next, in step 89, the trajectory selection unit 25 calculates the transit time of the reference trajectory and the transit time of the comparison trajectory. When the transit time of the reference trajectory is equal to or less than the transit time of the comparison trajectory, the routine proceeds to step 90. In step 90, the trajectory selection unit 25 selects the reference trajectory 41 as a trajectory for driving the robot 13.

In step 89, when the transit time of the reference trajectory is greater than the transit time of the comparison trajectory, the routine proceeds to step 91. In step 91, the trajectory selection unit 25 selects the comparison trajectory 42 as a trajectory for driving the robot 13. As described above, a trajectory of which a transit time is shorter can be selected.

The trajectory generation apparatus of the present embodiment generates the comparison trajectory when the speed needs to be reduced on the reference trajectory. Further, an operation time of the reference trajectory is compared with an operation time of the comparison trajectory, and a trajectory of which an operation time is shorter is selected. Therefore, the trajectory can be automatically generated while suppressing deceleration of the robot. In addition, an operation time of the robot can be shortened.

In particular, the curvature radius of the newly generated comparison trajectory 42 is larger than that of the reference trajectory 41 with reference to FIG. 3. Therefore, the comparison speed on the comparison trajectory 42 can be set faster than the reference speed on the reference trajectory 41 in some cases. Further, the comparison trajectory 42 is shorter than the reference trajectory 41 in length. Therefore, in the comparison trajectory 42, movement from the reference teaching point P1 to the reference teaching point P3 can be performed in a short time in some cases. The trajectory generation apparatus of the present embodiment can automatically generate a trajectory through which movement can be performed in a short time.

The comparison trajectory generation unit 24 of the trajectory generation apparatus 11 of the present embodiment generates the comparison trajectory 42 based on the predetermined allowable condition of trajectory. By adopting this control, the comparison trajectory 42 satisfying a desired condition can be automatically generated.

According to the above-described embodiment, torque is adopted as a load applied to the component of the robot, however, an arbitrary load applied to the component can be selected without being limited to the embodiment. For example, a change rate of torque can be adopted as a load. The change rate of torque can be calculated based on a difference between torque of a predetermined point and torque of either of points before and after the predetermined point on a trajectory.

When the change rate of torque is adopted as a load, a judgement value of the change rate of torque is adopted as the load judgement value. The load judgement unit 22 can calculate the change rate of torque from jerk (a change rate of acceleration) of each shaft of the robot. Alternatively, the load judgement unit 22 may calculate the change rate of torque from torque (acceleration) applied to each shaft of the robot. Further, the load judgement unit 22 can compare the calculated change rate of torque with the judgement value.

For judgement of a load, a plurality of variables may be adopted. For example, both of torque and a change rate of torque can be adopted as a load. For example, when both of the variables are equal to or less than the judgement value, it can be judged that the load is equal to or less than the load judgement value.

When the comparison teaching point is set by moving the reference teaching point, a plurality of movement methods and a plurality of movement lengths can be considered (see FIG. 4 to FIG. 7). Thus, a plurality of comparison trajectories can be generated based on the plurality of movement directions and the plurality of movement lengths. Then, a trajectory of which a transit time is the shortest can be selected. Next, control for generating a plurality of comparison trajectories is described.

Figure 9:
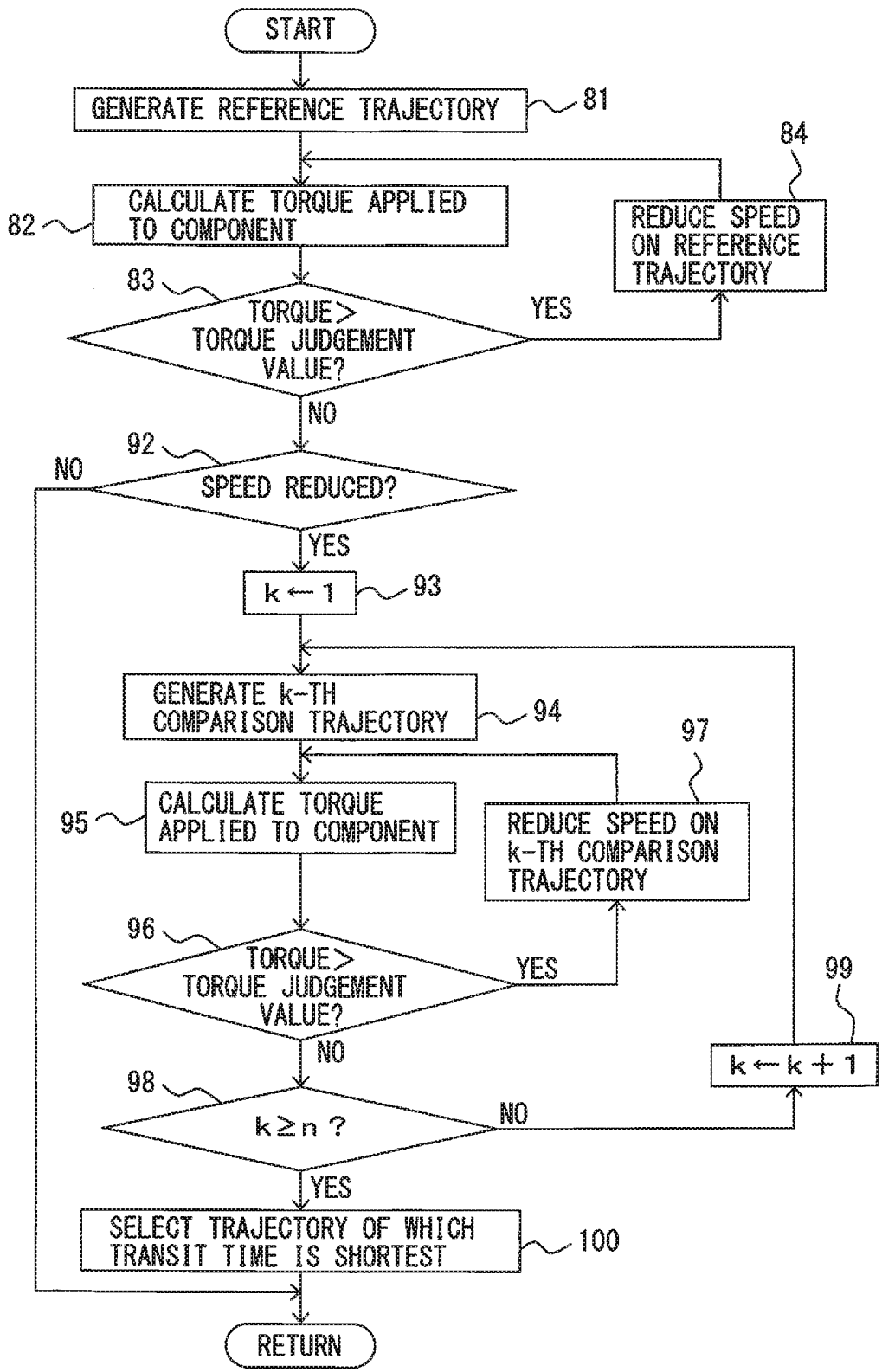
FIG. 9 is a flowchart of second control for generating a trajectory of a robot according to the embodiment.

FIG. 9 shows a flowchart illustrating second control of the trajectory generation apparatus according to the present embodiment. The control from step 81 to step 84 is similar to the first control (see FIG. 8) of the present embodiment.

The control in step 92 is similar to the first control. In the second control, the comparison trajectory generation unit 24 generates a plurality of comparison trajectories when the speed is reduced on the reference trajectory. Types of the comparison trajectories to be generated can be determined in advance. In the example, n pieces of first to n-th comparison trajectories are generated. For example, when the reference teaching point is moved according to two movement directions and two movement lengths, the number n of the comparison trajectories to be generated is four.

In step 93, the comparison trajectory generation unit 24 set a variable k to one. In step 94, the comparison trajectory generation unit 24 generates a k-th comparison trajectory. As the initial speed on the comparison trajectory, a speed the same as the initial speed on the reference trajectory can be adopted. By the control from step 95 to step 97, the comparison speed on the k-th comparison trajectory is set. The control from step 95 to step 97 is similar to the control from step 86 to step 88 in the first control (see FIG. 8).

In step 98, the comparison trajectory generation unit 24 judges whether or not the variable k is the number n of the comparison trajectories which is determined in advance. In step 98, when the variable k does not reach the predetermined number of the comparison trajectories, the routine proceeds to step 99.

In step 99, the comparison trajectory generation unit 24 adds one to the variable k. Then, in step 94, a next comparison trajectory is generated. In step 98, when the variable k reaches the predetermined number n of the comparison trajectories, generation is completed for all of the comparison trajectories. In this case, the routine proceeds to step 100.

In step 100, the trajectory selection unit 25 calculates the transit time of the reference trajectory. Further, the trajectory selection unit 25 calculates the transit times of n pieces of the comparison trajectories. The trajectory selection unit 25 selects a trajectory of which a transit time is the shortest from among the reference trajectory and n pieces of the comparison trajectories.

By performing the second control, a plurality of comparison trajectories can be generated, and a trajectory of which an operation time is the shortest can be selected. An arbitrary method can be adopted to the generation method for a plurality of comparison trajectories. As described above, the present invention can be applied to a case in which a plurality of comparison trajectories are generated.

According to the above-described generation method for the reference trajectory and the comparison trajectory, a trajectory generated based on the teaching point is allowed to be separated from the teaching point. The generation method for a trajectory is not limited to the above-described embodiment, and a trajectory may be generated so as to pass through a teaching point specified in advance.

Figure 10:
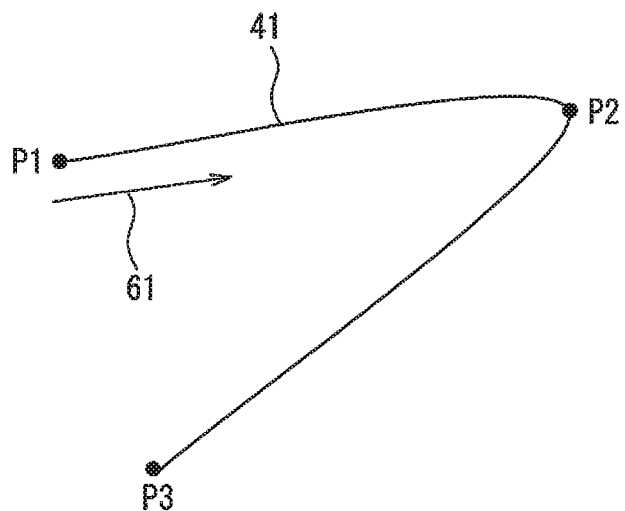
FIG. 10 is a schematic drawing illustrating a second reference trajectory according to the embodiment.
Figure 11:
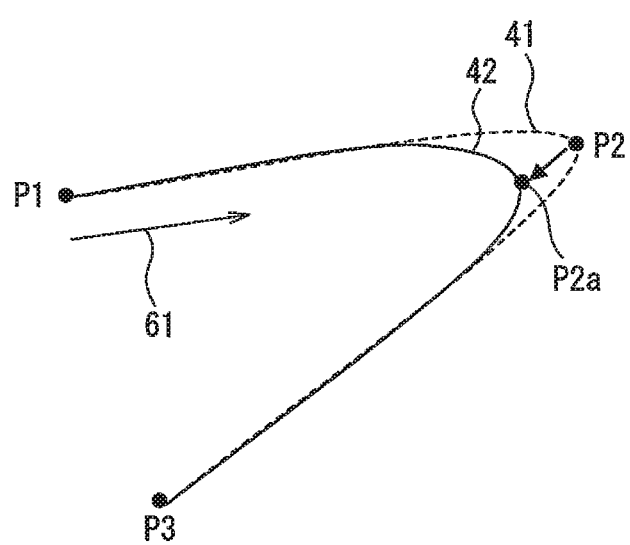
FIG. 11 is a schematic drawing illustrating a second comparison trajectory according to the embodiment.

FIG. 10 shows a schematic drawing illustrating a second reference trajectory according to the present embodiment. FIG. 11 shows a schematic drawing illustrating a second comparison trajectory according to the present embodiment. With reference to FIG. 10 and FIG. 11, the reference trajectory 41 is formed so as to pass through the reference teaching points P1, P2, and P3 which are specified in advance. As for such a reference trajectory 41, a spline curve can be generated so as to pass through each of the reference teaching points P1, P2, and P3. In addition, the comparison trajectory 42 can be similarly generated so as to pass through the comparison teaching point P2a.

In the above description, a case when there are three teaching points is exemplified, however, when there are four or more teaching points, a trajectory can be generated using the method similar to the above-described method by selecting three successive teaching points without being limited to the embodiment.

Figure 12:
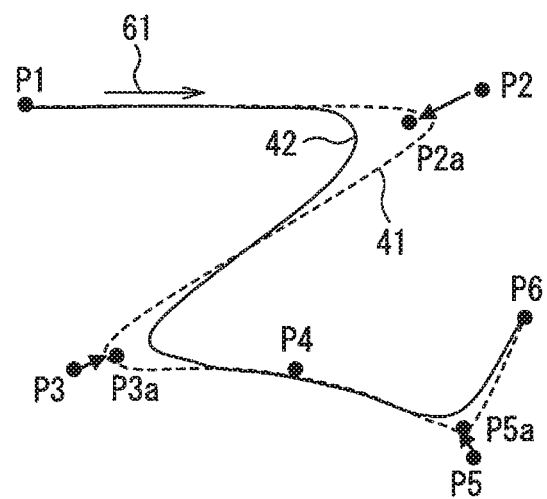
FIG. 12 is a schematic drawing illustrating a third reference trajectory and a third comparison trajectory according to the embodiment.

FIG. 12 shows a schematic drawing illustrating a third reference trajectory and a third comparison trajectory according to the present embodiment. In the example illustrated in FIG. 12, a trajectory to be generated is allowed to be deviated from original teaching points P1 to P6. When there are four or more teaching points, three successive teaching points Pn−1, Pn, and Pn+1 can be selected. A trajectory can be generated based on the teaching points Pn−1, Pn, and Pn+1. Then, a plurality of trajectories generated based on the three teaching points are connected to each other, and an entire trajectory can be generated.

For example, the reference teaching points P2, P3, and P4 are selected, and the curved portion of the reference trajectory 41 from the reference teaching point P2 to the reference teaching point P4 can be generated. Further, a comparison teaching point P3a can be set by performing the above-described control. Then, the curved portion of the comparison trajectory 42 from the reference teaching point P2 to the reference teaching point P4 can be generated based on the reference teaching points P2 and P4 and the comparison teaching point P3a. In this example, the comparison teaching points P2a, P3a, and P5a are set with respect to the reference teaching points P2, P3, and P5.

Figure 13:
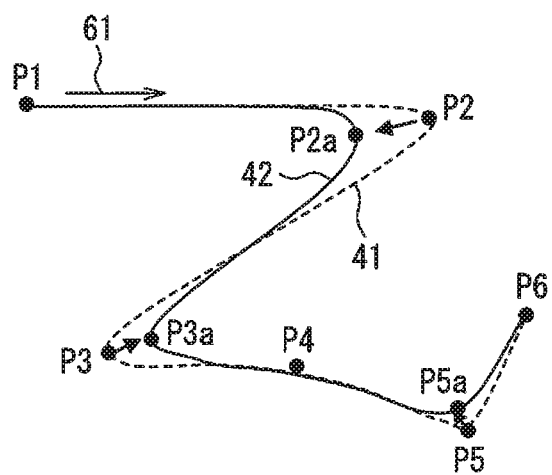
FIG. 13 is a schematic drawing illustrating a fourth reference trajectory and a fourth comparison trajectory according to the embodiment.

FIG. 13 shows a schematic drawing illustrating a fourth reference trajectory and a fourth comparison trajectory according to the present embodiment. In the example illustrated in FIG. 13, a trajectory is generated so as to pass through original teaching points. Similar to the case in FIG. 12, when there are four or more reference teaching points, three successive reference teaching points are selected, and the reference trajectory and the comparison trajectory can be generated. In the example, the comparison teaching points P2a, P3a, and P5a are set with respect to the reference teaching points P2, P3, and P5.

According to the present invention, the trajectory generation apparatus for robot can be provided which automatically generates a trajectory while suppressing deceleration of the robot when a large load is applied to the robot.

In each control described above, the order of steps can be appropriately changed within a range not changing a function and an operation. The above-described embodiments can be appropriately combined. In the drawings described above, same or corresponding portions are denoted by the same reference numerals. The embodiments described above are merely examples and not intended to limit the scope of the present invention. Further, the embodiments include an example modified within the scope of the present invention.

The invention claimed is:

1. A trajectory generation apparatus for robot comprising:
   a reference trajectory generation unit which generates a reference trajectory including a curved portion based on a plurality of reference teaching points;
   a load judgement unit which calculates a load applied to a predetermined component of a robot when the robot is operated along the reference trajectory and compare the load with a predetermined load judgement value;
   a speed reduction unit which reduces a speed of the robot until the load becomes equal to or less than the load judgement value when the load is greater than the load judgement value;
   a comparison trajectory generation unit which sets a comparison teaching point obtained by changing a position of the reference teaching point when the speed is reduced by the speed reduction unit and generates a comparison trajectory based on the comparison teaching point; and a trajectory selection unit which compares a transit time of the comparison trajectory with a transit time of the reference trajectory and selects a trajectory of which a transit time is shorter.

2. The trajectory generation apparatus for robot according to claim 1, wherein the comparison trajectory generation unit sets the comparison teaching point so that a curvature radius of the comparison trajectory is larger than a curvature radius of the reference trajectory at the curved portion.

3. The trajectory generation apparatus for robot according to claim 1, wherein the comparison trajectory generation unit generates the comparison trajectory based on a predetermined allowable condition of trajectory, and the allowable condition of trajectory is a matter that a distance from the reference teaching point to the comparison trajectory is less than a predetermined judgement value.

4. The trajectory generation apparatus for robot according to claim 1, wherein the comparison trajectory generation unit generates the comparison trajectory based on a predetermined allowable condition of trajectory, and the allowable condition of trajectory is a matter that a distance between the reference trajectory and the comparison trajectory is less than a predetermined judgement value.

5. The trajectory generation apparatus for robot according to claim 1, wherein the load is torque applied to the component, and the load judgement unit calculates the torque from acceleration of each shaft of the robot.

6. The trajectory generation apparatus for robot according to claim 1, wherein the load is a change rate of torque applied to the component, and the load judgement unit calculates the change rate of torque from jerk of each shaft of the robot.

* * * * *